(12) United States Patent
Comaniciu et al.

(10) Patent No.: US 7,260,259 B2
(45) Date of Patent: Aug. 21, 2007

(54) IMAGE SEGMENTATION USING STATISTICAL CLUSTERING WITH SADDLE POINT DETECTION

(75) Inventors: Dorin Comaniciu, Princeton, NJ (US); Visvanathan Ramesh, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 873 days.

(21) Appl. No.: 10/338,335

(22) Filed: Jan. 8, 2003

(65) Prior Publication Data

US 2003/0174889 A1 Sep. 18, 2003

Related U.S. Application Data

(60) Provisional application No. 60/346,690, filed on Jan. 8, 2002.

(51) Int. Cl.
*G06K 9/34* (2006.01)
(52) U.S. Cl. ........................ 382/173; 382/190; 382/162
(58) Field of Classification Search .............. 382/173, 382/171, 240, 162, 190, 164, 255, 288, 165, 382/170, 199, 133; 702/179, 189; 706/17, 706/20, 50; 707/2, 104.1
See application file for complete search history.

(56) References Cited

U.S. PATENT DOCUMENTS

| | | | | |
|---|---|---|---|---|
| 5,343,538 A | * | 8/1994 | Kasdan | 382/165 |
| 6,049,793 A | * | 4/2000 | Tomita | 706/17 |
| 6,584,433 B1 | * | 6/2003 | Zhang et al. | 702/189 |
| 6,931,350 B2 | * | 8/2005 | Zhang | 702/179 |
| 6,944,607 B1 | * | 9/2005 | Zhang et al. | 707/2 |

* cited by examiner

*Primary Examiner*—Anh Hong Do
(74) *Attorney, Agent, or Firm*—Donald B. Paschburg; F. Chau & Associates, LLC (57) ABSTRACT

A system and method for image segmentation using statistical clustering with saddle point detection includes representation means for representing the image data in a joint space of dimension $d=r+2$ that includes two special coordinates, where $r=1$ for gray-scale images, $r=3$ for color images, and $r>3$ for multi-spectral images; partitioning means for partitioning the data set comprising a plurality of image data points into a plurality of statistically meaningful clusters by decomposing the data set by a mean shift based data decomposition; and characterization means for characterizing the statistical significance of at least one of a plurality of clusters of data points by selecting a cluster and computing the value of a statistical measure for the saddle point lying on the border of the selected cluster and having the highest density.

30 Claims, 10 Drawing Sheets

IMAGE SEGMENTATION USING STATISTICAL CLUSTERING WITH SADDLE POINT DETECTION

CROSS-REFERENCE TO RELATED APPLICATION

This application claims the benefit of U.S. Provisional Application Ser. No. 60/346,690, filed Jan. 8, 2002 and entitled "Image Segmentation using Statistical Clustering with Saddle Point Detection", which is incorporated herein by reference in its entirety.

BACKGROUND

Data clustering as a problem in pattern recognition and statistics belongs to the class of unsupervised learning. It essentially involves the search through the data for observations that are similar enough to be grouped together. There is a large body of literature on this topic. Algorithms from graph theory, matrix factorization, deterministic annealing, scale space theory, and mixture models have all been used to delineate relevant structures within the input data.

However, the clustering task is inherently subjective. There is no accepted definition of the term "cluster" and any clustering algorithm will produce some partitions. Therefore, the ability to statistical characterize the decomposition and to assess the significance of the resulting number of clusters is an important aspect of the problem.

Approaches for estimating the number of clusters can be divided into global and local methods. The former evaluate some measure over the entire data set and optimize it as function of the number of clusters. The latter consider individual pairs of clusters and test whether they should be joined together. A general descriptions of methods used to estimate the number of clusters are provided in the literature, while one study conducts a Monte Carlo evaluation of 30 indices for cluster validation. These indices are typically functions of the "within" and "between" cluster distances and belong to the class of "internal" measures, in the sense that they are computed from the same observation used to create a partition. Consequently, their distribution is intractable and they are not suitable for hypothesis testing.

Thus, the majority of existing methods for estimating the validity of the decomposition do not attempt to perform a formal statistical procedure, but rather look for a clustering structure under which the statistic of interest is optimal, such as maximization or minimization of an objective function. Validation methods that do not suffer from this limitation were recently proposed, but are computationally expensive since they require simulating multiple datasets from the null distribution.

SUMMARY

These and other drawbacks and disadvantages of the prior art are addressed by a system and method for Image Segmentation using Statistical Clustering with Saddle Point Detection.

A system and corresponding method for image segmentation using statistical clustering with saddle point detection includes representation means for representing the image data in a joint space of dimension $d=r+2$ that includes two special coordinates, where $r=1$ for gray-scale images, $r=3$ for color images, and $r>3$ for multi-spectral images; partitioning means for partitioning the data set comprising a plurality of image data points into a plurality of statistically meaningful clusters by decomposing the data set by a mean shift based data decomposition; and characterization means for characterizing the statistical significance of at least one of a plurality of clusters of data points by selecting a cluster and computing the value of a statistical measure for the saddle point lying on the border of the selected cluster and having the highest density.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches Image Segmentation using Statistical Clustering with Saddle Point Detection in accordance with the following exemplary figures, in which.

DETAILED DESCRIPTION OF PREFERRED EMBODIMENTS

The present disclosure teaches Image Segmentation using Statistical Clustering with Saddle Point Detection. In an exemplary embodiment, a statistical framework is provided for image segmentation based on nonparametric clustering. By employing the mean shift procedure for analysis, image regions are identified as clusters in the joint color spatial domain. To measure the significance of each cluster, a statistical test compares the estimated density of the cluster mode with the estimated density on the cluster boundary. The cluster boundary in the color domain is defined by saddle points lying on the cluster borders defined in the spatial domain. This provided technique compares favorably to other segmentation methods described in literature and known in the art. The presently disclosed technique has application in many areas, including, for example, industry and medical care. In this specification, the notation f' as used in the text is equivalent to the f-hat used in the equations and figures.

Figure 12:
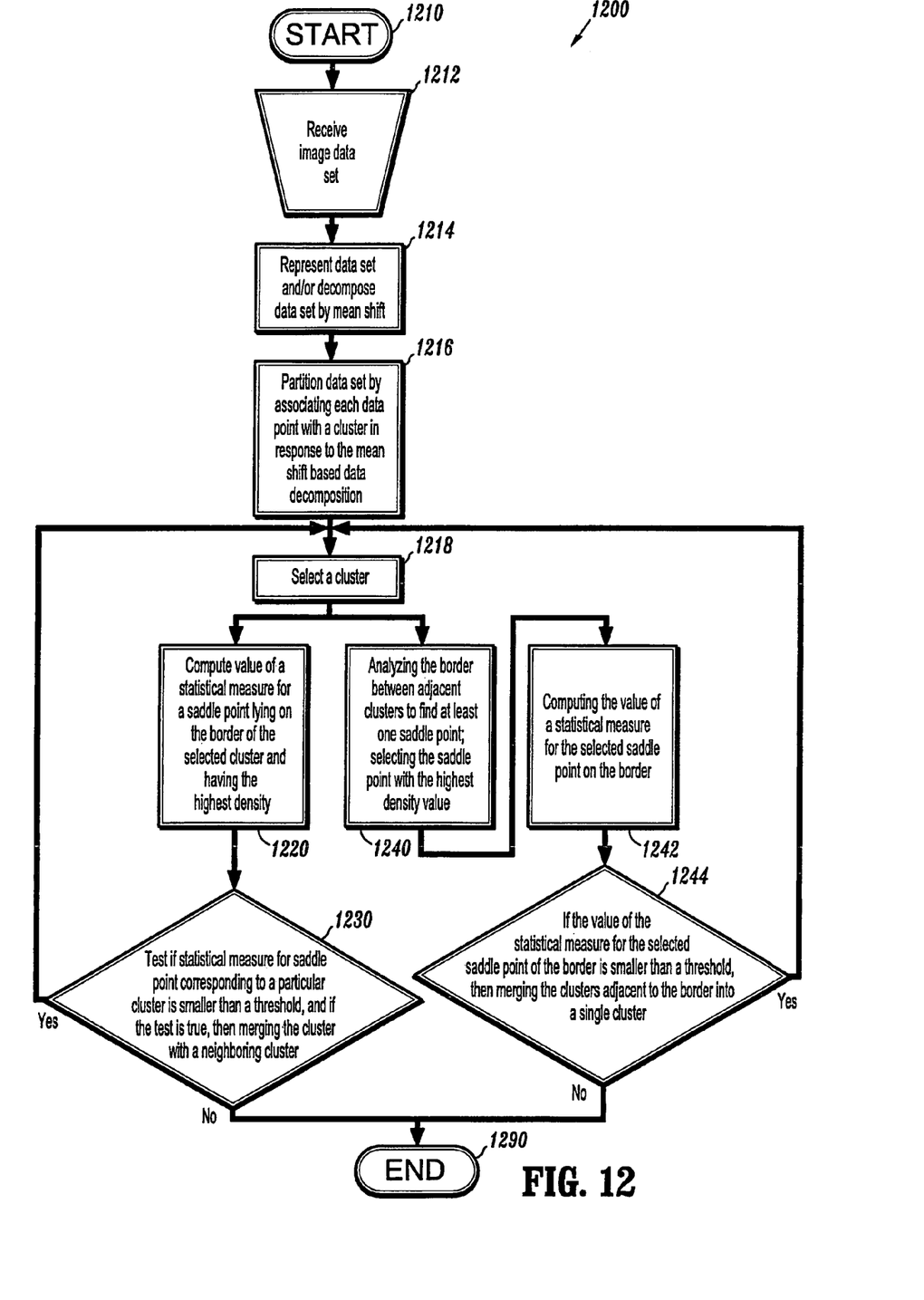

As shown in FIG. 12, a method of partitioning an image data set in accordance with an exemplary embodiment of the present disclosure is indicated generally by the reference numeral 1200. The method 1200 includes a start block 1210 that passes control to a function block 1212. The function block 1212 receives an image data set, and passes control to a function block 1214. The function block 1214, in turn, represents the data set and/or decomposes the data set by use of mean shift based data decomposition. The function block 1214 passes control to a function block 1216, which partitions the data set by associating each data point with a cluster in response to the mean shift based data decomposition. The function block 1216 passes control to a function block 1218. The function block 1218 selects a cluster, and passes control to each of a function block 1220 and a function block 1240.

The function block 1220 computes the value of a statistical measure for a saddle point lying on the border of the selected cluster and having the highest density, and passes control to a decision block 1230. The decision block 1230 tests if the statistical measure for a saddle point corresponding to a particular cluster is smaller than a threshold, and if the test is true, then merges the cluster with a neighboring cluster and passes control back to the function block 1218. If the test is not true, control may be passes to an end block 1290.

The function block 1240 analyzes the border between adjacent clusters to find at least one saddle point, and selects the saddle point with the highest density value. The function block 1240 then passes control to a function block 1242, which computes the value of a statistical measure for the selected saddle point on the border, and passes control to a decision block 1244. The decision block 1244 checks whether the value of the statistical measure for the selected saddle point of the border is smaller than a threshold, and if so merges the clusters adjacent to the border into a single cluster and passes control back to the function block 1218. If, on the other hand, the value of the statistical measure for the selected saddle point of the border is not smaller than the threshold, control may be passed to the end block 1290.

Segmentation using clustering involves the search for image points that are similar enough to be grouped together. Algorithms from graph theory, matrix factorization, deterministic annealing, scale space theory, and mixture models may be used to delineate relevant structures within the input data. A new and practical approach to image segmentation using a nonparametric model for image regions is described. According to this model, the regions are seen as clusters associated to local maxima ("modes") of the probability density function computed in the joint color spatial domain. To evaluate the cluster significance, a test statistic is employed that compares the estimated density of the mode with the estimated density on the cluster boundary. The latter density is measured in the saddle points lying on the cluster border defined in the spatial domain. An algorithm is described for the detection of saddle points.

Importance of Modes and Saddle Points

The modes and saddle points of the density are important for characterizing the underlying data structure. Clustering using the nonparametric estimation of the data density is achieved by identifying local maxima (modes) and their basins of attractions in the multivariate surface of the data density function. The modes of the density are usually detected using the gradient ascent mean shift procedure, discussed in the next section. All the data points lying in the basin of attraction of a mode will form a separated cluster. In the case of a density function with constant values at a peak, the points on this peak are considered a single mode, called a plateau. Similarly, all the data points lying in the basin of attraction of a plateau form a separated cluster.

The number of observed modes depends on the bandwidth of the kernel used to compute the density estimate. In general the number of modes decreases with the increase of the bandwidth. The most common test for the true number of modes in a population is based on critical bandwidths, the infinum of those bandwidths for which the kernel density estimate is at most m-modal.

A different approach has been proposed for the univariate case in M. Minnotte, Nonparametric Testing of the Existence of Modes, *The Annals of Statistics,* 25(4):1646–1660, 1997, where the validity of each mode is tested separately. The test statistic is a measure of the size of the of mode, the absolute integrate difference between the estimated density and the same density with the mode in question removed at the level of the higher of its two surrounding anti-modes. The p-value of the test is estimated through re-sampling. Note that an anti-mode is defined for the univariate data as the location with the lowest density between two modes. The main advantage of this technique is that each individual suspected mode is examined, while the bandwidth used in the test can be selected adaptively as smallest bandwidth at which the mode still remains a single object.

Figure 4:
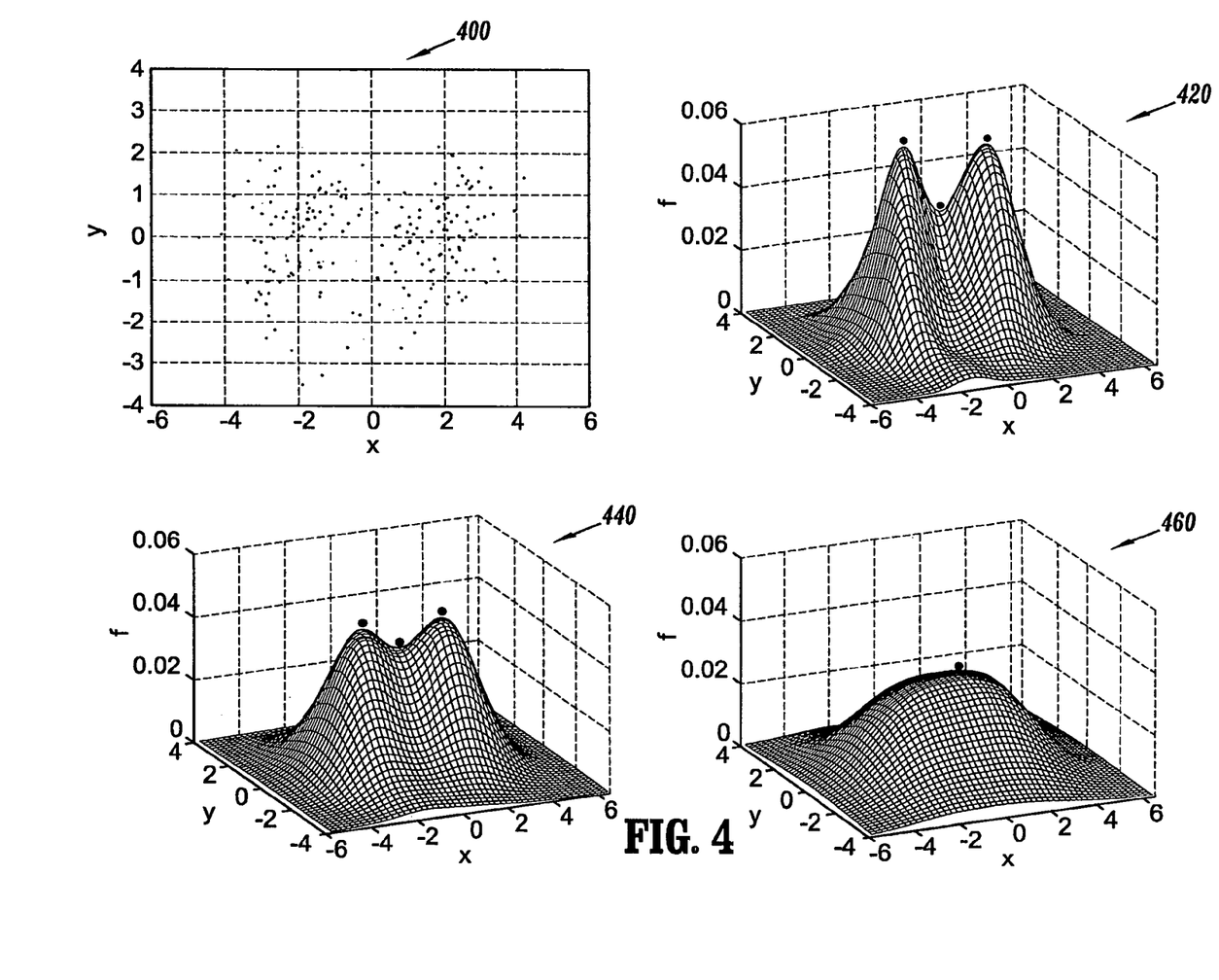
FIG. 4 shows plots of modes and saddle points.

As shown in FIG. 4, the importance of modes and saddle points is illustrated by: (a) Input data containing 100 points from each bivariate $N([1.8,0],I)$ and $N([1.8,0],I)$, indicated generally by the reference numeral 400; (b) Density estimate with a two dimensional symmetric normal kernel with h=0.6, indicated generally by the reference numeral 420. The modes are marked with green dots, while the saddle point is marked with a red dot; (c) Density estimate with h=0.9 indicated generally by the reference numeral 440; and (d) Density estimate with h=1.35 indicated generally by the reference numeral 460. The two modes and the saddle point collapse into one mode.

In the present disclosure, a test statistic is defined having a distribution that can be evaluated through statistical inference by taking into account its sampling properties. In addition, since the anti-modes defined for univariate data translate into saddle points for the multivariate case we will need an algorithm for saddle point computation.

To give the reader an initial view on the problem we present in FIG. 4(a) a sample data set drawn from two bivariate normals, while FIG. 4(b), FIG. 4(c), and FIG. 4(d) show the corresponding probability density estimate obtained with a two dimensional normal kernel with bandwidth h=0.6, h=0.9, and h=1.35, respectively. The detected modes are marked with green dots, while the saddle points are marked with red dots.

A number of observations can be made using FIG. 4. First, for a given bandwidth, the number of observed modes determines the number of distinct structures in the density estimate. The mode density is an indication of the compactness of the associated structure. The difference between the mode density and the saddle point density is an indication of the isolation of the observed structure. In addition, both the mode density and the mode saddle density difference decrease with the increase of the bandwidth. When the mode density becomes equal to the saddle density the observed structures are amalgamated into a new one. Hence, the appropriate analysis bandwidth should be the smallest bandwidth at which the mode in question still remains a single object.

A rigorous treatment of the evolution of the zero crossings of the gradient of a function along the bandwidth is provided in the literature. The catastrophe theory investigates the behavior of the singularities of a function in families of functions such as the family of densities generated by using various bandwidths.

Mean Shift Based Data Decomposition

In this section we define the mean shift vector, introduce the iterative mean shift procedure, and describe its use in the data decomposition.

The Mean Shift Procedure

Given n data points $x_i$, i=1 . . . n in the d-dimensional space $R^d$, the multivariate mean shift vector computed with kernel K in the point x is given by $$m_K(x) \equiv \frac{\sum_{i=1}^{n} x_i K\left(\frac{x - x_i}{h}\right)}{\sum_{i=1}^{n} K\left(\frac{x - x_i}{h}\right)} \quad (B1)$$

where h is the kernel bandwidth. In the following we will use the symmetric normal kernel defined as $$K(x) = (2\pi)^{-d/2} \exp\left(-\frac{1}{2}\|x\|^2\right) \quad (B2)$$

It can be shown that the mean shift vector at location x is proportional to the normalized density gradient estimate computed with kernel K $$m_K(x) = h^2 \frac{\hat{\nabla} f K(x)}{\hat{f} K(x)} \quad (B3)$$

The normalization is by the density estimate in x obtained with kernel K. Note that this formula changes a bit for kernels different from the normal.

The relation captured in (Eqn. B3) is intuitive, the local mean is shifted toward the region in which the majority of the points reside. Since the mean shift vector is aligned with the local gradient estimate it can define a trajectory leading to a stationary point of the estimated density. Local maxima of the underlying density, i.e., the modes, are such stationary points.

The mean shift procedure is obtained by successive computation of the mean shift vector $m_K(x)$, and translation of the kernel K(x) by $m_K(x)$, and is guaranteed to converge at a nearby point where the density estimate has zero gradient.

For Data Decomposition, denote the sequence of successive locations of the kernel K, where $$y^{j+1} = \frac{\sum_{i=1}^{n} x_i K\left(\frac{y^j - x_i}{h}\right)}{\sum_{i=1}^{n} K\left(\frac{y^j - x_i}{h}\right)}, j = 1, 2... \quad (B4)$$

is the weighted mean at $y^j$ computed with kernel K and $y^1$ is the center of the initial kernel. By running the mean shift procedure for all input data, each point $x_i$, i=1, . . . , n becomes associated to a point of convergence denoted by $y_i$ where the underlying density has zero gradient. A test for local maximum is therefore needed. This test can involve a check on the eigen-values of the Hessian matrix of second derivatives, or a check for the stability of the convergence point. The latter property can be tested by perturbing the convergence point by a random vector of small norm, and letting the mean shift procedure to converge again. Should the convergence point be the same, the point is a local maximum.

Depending on the local structure of the density hyper surface, the convergence points can form ridges or plateaus. Therefore, the mean shift procedure should be followed be a simple clustering which links together the convergence points that are sufficiently close to each other. The algorithm is given below.

Mean Shift Based Decomposition

For each i=1, . . . , n run the mean shift procedure for $x_i$ and store the convergence point in $y_i$. Identify clusters of convergence points by linking together all $y_i$ which are closer than h from each other. For each u=1 . . . m join together in cluster $D_u$ all the data points $x_i$ having the corresponding convergence point in $B_u$.

Figure 5:
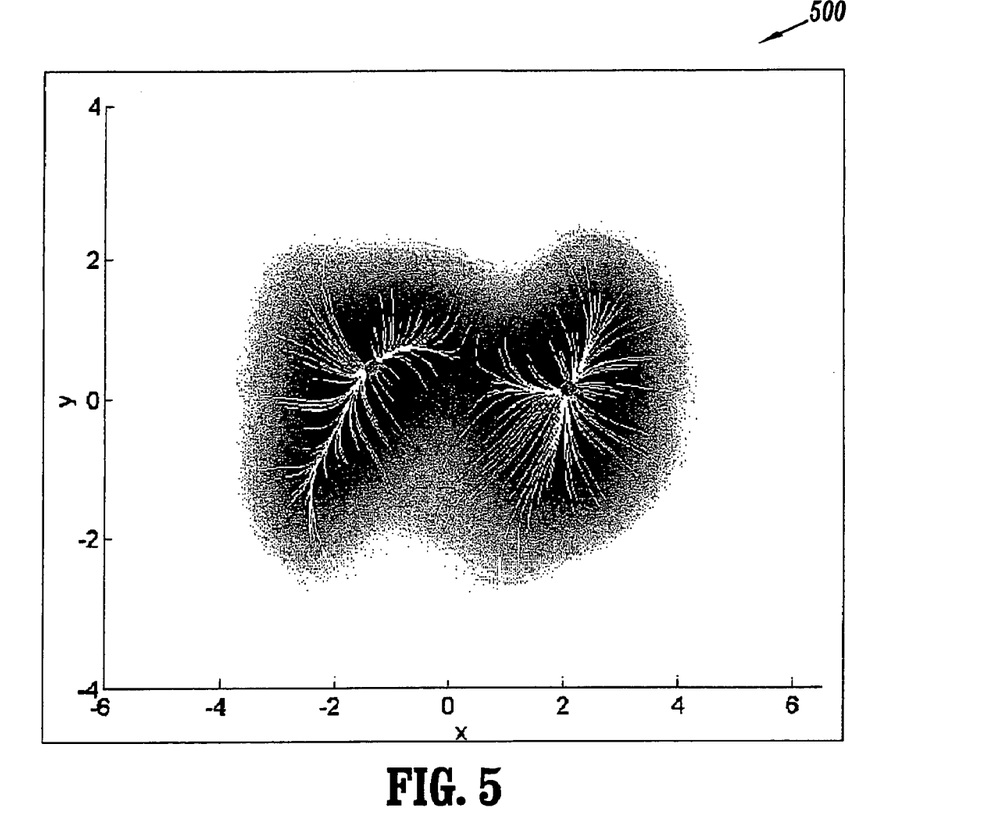
FIG. 5 shows a decomposition example where the mean shift procedure with h=0.6 is applied for the data set of FIG. 4, the trajectory of each point is shown together with the two modes superimposed on the density surface, and the view angle is from above.

Turning to FIG. 5, a decomposition example is indicated generally by the reference numeral 500. Observe that the mean shift trajectories are smooth, verifying a property remarked that the cosine of the angle between two consecutive mean shift vectors is strictly positive when a normal kernel is employed.

An advantage of this type of decomposition is twofold. First is requires a weak assumption about the underlying data structure, namely, that a probability density can be estimated nonparametrically. In addition, the method scales well with the space dimension, since the mean shift vector is computed directly from the data.

Saddle Point Detection

An algorithm embodiment of the present disclosure is provided for finding the saddle points associated with a given bandwidth h and a partition $\{D_u\}_{u=1 \ldots m}$ obtained through mean shift decomposition. First order saddle points are detected, having the Hessian matrix with one positive eigen-value and all other eigen-values negative. A cluster index v is selected and the complementary cluster set is defined as:

$$C_v \equiv \bigcup_{u \neq v} D_u. \tag{A3}$$

In the following the index v is dropped for the simplicity of the equations. Two functions are defined:

$$\hat{f}_{D,K}(x) = \frac{1}{nh^d} \sum_{x_D \in D} K\left(\frac{x - x_D}{h}\right) \tag{A4}$$

and $$\hat{f}_{C,K}(x) = \frac{1}{nh^d} \sum_{x_C \in C} K\left(\frac{x - x_C}{h}\right) \tag{A5}$$

whose superposition at x equals the density estimate at x:

$$\hat{f}_k(x) \equiv \frac{1}{nh^d} \sum_{i=1}^{n} K\left(\frac{x - x_i}{h}\right) = \hat{f}_{D,K}(x) + \hat{f}_{C,K}(x). \tag{A6}$$

Computing now the gradient of expression A6, multiplying by $h^2$, and normalizing by $\hat{f}_K$ it results that $$m_K(x) = h^2 \frac{\hat{\nabla} \hat{f}_K(x)}{\hat{f}_K(x)} = \alpha_D(x) m_{D,K}(x) + \alpha_C(x) m_{C,K}(x) \tag{A7}$$

where $$m_{D,K}(x) = \frac{\sum_{x_D \in D} x_D K\left(\frac{x - x_D}{h}\right)}{\sum_{x_D \in D} K\left(\frac{x - x_D}{h}\right)} - x \tag{A8}$$

$$m_{C,K}(x) = \frac{\sum_{x_C \in C} x_C K\left(\frac{x - x_C}{h}\right)}{\sum_{x_C \in C} K\left(\frac{x - x_C}{h}\right)} - x \tag{A9}$$

are the mean shift vectors computed only within the sets and C respectively, and $$\alpha_D(x) = \frac{\hat{f}_{D,K}(x)}{\hat{f}_K(x)} \quad \alpha_C(x) = \frac{\hat{f}_{C,K}(x)}{\hat{f}_K(x)} \tag{A10}$$

with $D(x)+C(x)=1$. Equation A7 shows that the mean shift vector at any point x is a weighted sum of the mean shift vectors computed separately for the points in the sets D and C. We exploit this property for the finding of saddle points. Assume that $x_s$ is a saddle point of first order located on the boundary between D and C. The boundary condition is $$m_K(x_s) = 0 \tag{A11}$$

which means that the vectors $D(x_s)m_D$, $K(x_s)$ and $C(x_s)m_C$, $K(x_s)$ have equal magnitude, are collinear, but point towards opposite directions. The vectors are defined:

$$r_D(x) = \frac{\|\alpha_C(x) m_{C,K}(x)\|}{\|\alpha_D(x) m_{D,K}(x)\|} \alpha_D(x) m_{D,K}(x) \tag{A12}$$

and $$r_C(x) = \frac{\|\alpha_D(x) m_{D,K}(x)\|}{\|\alpha_C(x) m_{C,K}(x)\|} \alpha_C(x) m_{C,K}(x) \tag{A13}$$

and obtained by switching the norms of $D(x_s)m_D$, $K(x_s)$ and $C(x_s)m_C$, $K(x_s)$. Note that in case of a perturbation of $x_s$ towards C and along the line defined by $D(x_s)m_D$, $K(x_s)$ and $C(x_s)m_C$, $K(x_s)$, the resultant:

$$r(x) = r_D(x) + r_C(x) \tag{A14}$$

will point towards the saddle point. Since the saddle point is of first order, it will be also stable for the directions perpendicular to r(x) hence it will be a stable point with basin of attraction. The algorithm uses the newly defined basin of attraction to converge to the saddle point. The saddle point detection should be started close to a valley, i.e., at locations having divergent mean shift vectors coming from the sets D and C $$\alpha_D(x) \alpha_C(x) m_{D,K}(x)^T m_{C,K}(x) < 0 \tag{A15}$$

Since the data is already partitioned it is simple to search for points that verify condition of Eqn. A15. If one starts the search from a point in D just follow the mean shift path defined by $m_{C,K}(x)$ until the condition (Eqn. A15) is satisfied. Nevertheless, if the cluster D is isolated, the function $\hat{f}_{C,K}(x)$(Eqn. A5) will be close to zero for the data points belonging to x of D and can generate numerical instability. Therefore a threshold should be imposed on this function before computing $m_{C,K}(x)$. The algorithm for finding the saddle points lying on the border of D is given below.

Saddle Point Detection

Given a data partitioning into a cluster D and another set C containing the rest of the data points, For each $x_D$ of D, if the value of $\hat{f}_{C,K}(x_D)$(Eqn. A5) is larger than a threshold, 1. Follow the mean shift path defined by $m_{C,K}(x)$(Eqn. A9) until the condition (Eqn. A15) is satisfied; and 2. Follow the mean shift path defined by r(x)(Eqn. A14) until convergence.

Figure 6:
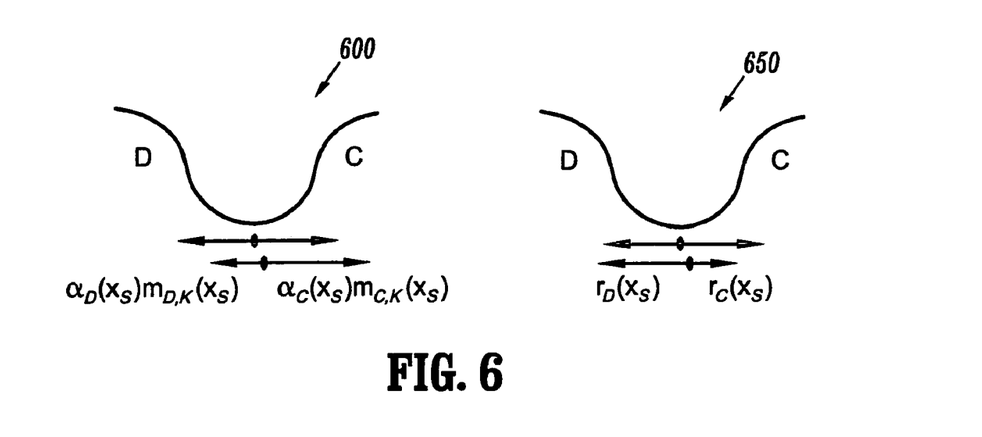
FIG. 6 shows solving first order saddle point instability where (a) A slight perturbation towards C along the line will determine the point to start moving towards C. (b) By employing the new vectors the saddle point becomes stable and has a basin of attraction.

FIG. 6 shows solving first order saddle point instability where (a) A slight perturbation towards C along the line will determine the point to start moving towards C, as indicated generally by the reference numeral 600. (b) By employing the new vectors the saddle point becomes stable and has a basin of attraction, as indicated generally by the reference numeral 650.

Figure 7:
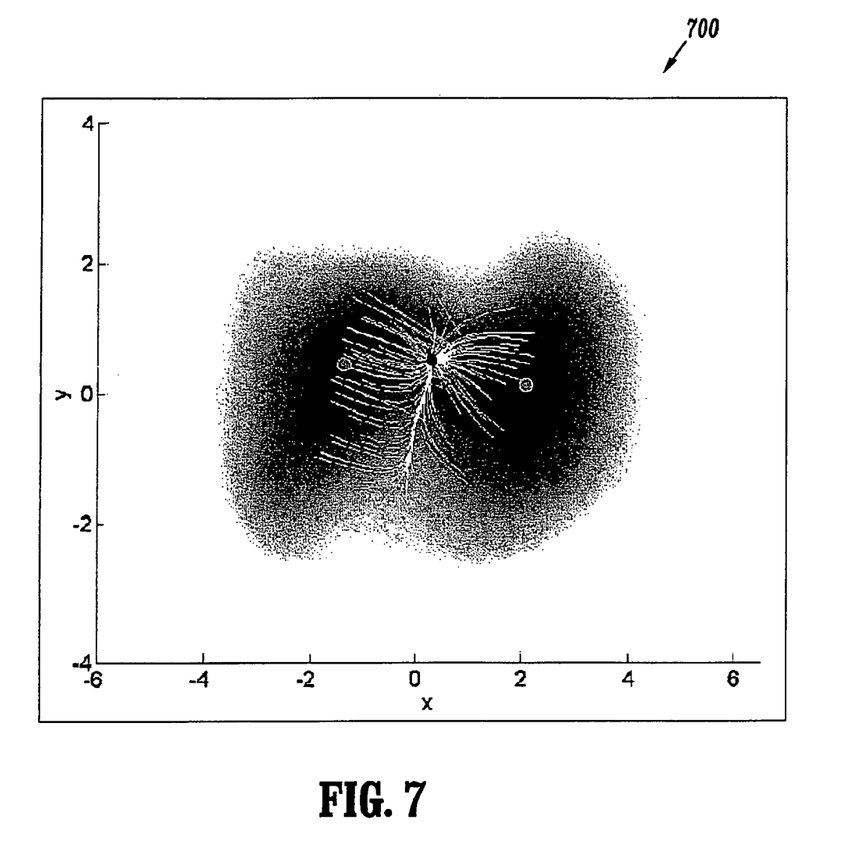
FIG. 7 shows a saddle point finding example. The algorithm was applied twice, for the data clustered as in FIG. 6, once for the left cluster and once for the right cluster. The trajectories are shown together with the two modes and the detected saddle point superimposed on the density surface. The view angle is from above.

An example of saddle point finding is shown in FIG. 7 and indicated generally by the reference numeral 700. There are two stages of the algorithm that are visible for some of the trajectories. When the second part of the algorithm is initialized, the trajectory can have a sharp turn to return back towards the valley. Afterwards however, the trajectory converges smoothly to a saddle point.

Significance Test for Cluster Validity

Denote by $x_s$ the saddle point with the largest density lying of the border of a given cluster characterized by the mode $y_m$. The point $x_s$ represents the "weakest" point of the cluster border. It requires the least amount of probability mass which should be taken from the neighborhood of $y_m$ and placed in the neighborhood of $x_s$ such that the cluster mode disappears.

To characterize this process, we will assume in the following that the amount of probability mass in the neighborhood of the mode is proportional with $\hat{f}_K(y_m)$, the probability density at the mode location, and the amount of probability mass in the neighborhood of the saddle point is proportional to $\hat{f}_K(x_s)$, the density at $x_s$. This approximation is shown in FIG. 8, which presents a vertical slice in the density function.

Note that more evolved formulas can be derived based on the mean shift trajectory starting from the saddle point, however, for larger dimensions it is difficult to compute the exact amount of probability mass in a neighborhood.

Figure 8:
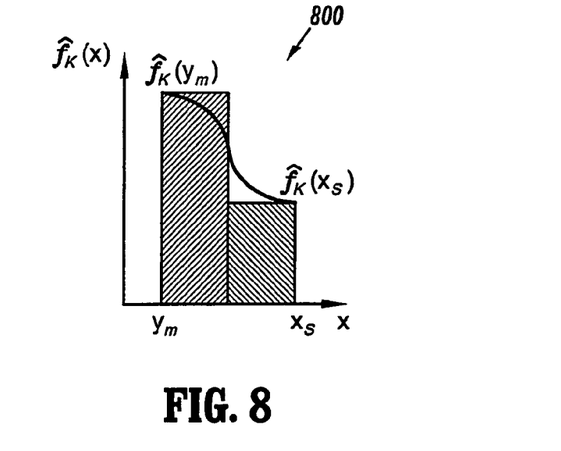
FIG. 8 shows approximation of the probability mass. The probability mass in the neighborhood is assumed proportional to $f'_K(y_m)$ and $f'_K(x_s)$, respectively.

Turning now to FIG. 8, a data model is indicated generally by the reference numeral 800. Using the approximation from above, we model the location of data points belonging to the cluster of cardinality $n_c$ as a Bernoulli random variable which has a probability of $$\hat{p} = \frac{\hat{f}_k(y_m)}{\hat{f}_k(y_m) + \hat{f}_k(x_8)} \tag{B18}$$

to lie in the mode neighborhood, and a probability of $$\hat{q} = 1 - \hat{p}\frac{\hat{f}_k(x_8)}{\hat{f}_k(y_m) + \hat{f}_k(x_8)} \tag{B19}$$

to lie in the saddle point neighborhood. Taking now into account the sampling properties of the estimator p' (p-hat in the equations, seen here as a random variable), the distribution of p' can be approximated under weak conditions as normal, with mean and variance given by $$\mu_p = p \quad \sigma_p^2 = \frac{\hat{p}(1-\hat{p})}{n_c} \tag{B20}$$

The null hypothesis which we test is the mode existence $$H_0: p>0.5 \text{ versus } H_1: p>0.5 \tag{B21}$$

Hence, the test statistic is written as:

$$z = \frac{\hat{p} - 0.5}{\sigma_p} \tag{B22}$$

and using equations (18) and (20) produces:

$$z = \frac{\sqrt{n_c}}{2} \frac{\hat{f}_k(y_m) - \hat{f}_k(x_8)}{\sqrt{\hat{f}_k(y_m)\hat{f}_k(x_8)}} \tag{B23}$$

The p-value of the test is the probability that z, which is distributed with N(0,1), is positive:

$$Prob(z \geq 0) = \frac{1}{\sqrt{2\pi}} \int_{-z}^{\infty} \exp(-t^2/2)\,dt \tag{B24}$$

A confidence of 0.95 is achieved when z=1.65.

Using the framework from above, the clusters delineated with h=0.6 shown in FIG. 4b have a confidence of 0.99 and 0.98, respectively, derived using the mode densities of 0.0614 and 0.0598 and a saddle point density of 0.0384. When h=0.9 (FIG. 4c) the two clusters have a confidence of 0.82 and 0.86, their mode densities are 0.0444 and 0.0460, while the saddle point density is 0.0369.

Clustering Experiments

Ideally, the input data should be analyzed for many different bandwidths and the confidence of each delineated cluster computed. This will guarantee the detection of significant clusters even when they exhibit different scales. An alternative method, less expensive is to choose one scale and join the least significant clusters until they become significant. We should, however, be cautious in joining too many clusters, because the approximation used in the computation of the p-value of the test assumes a certain balance between the peak and the saddle point neighborhood.

Figure 9:
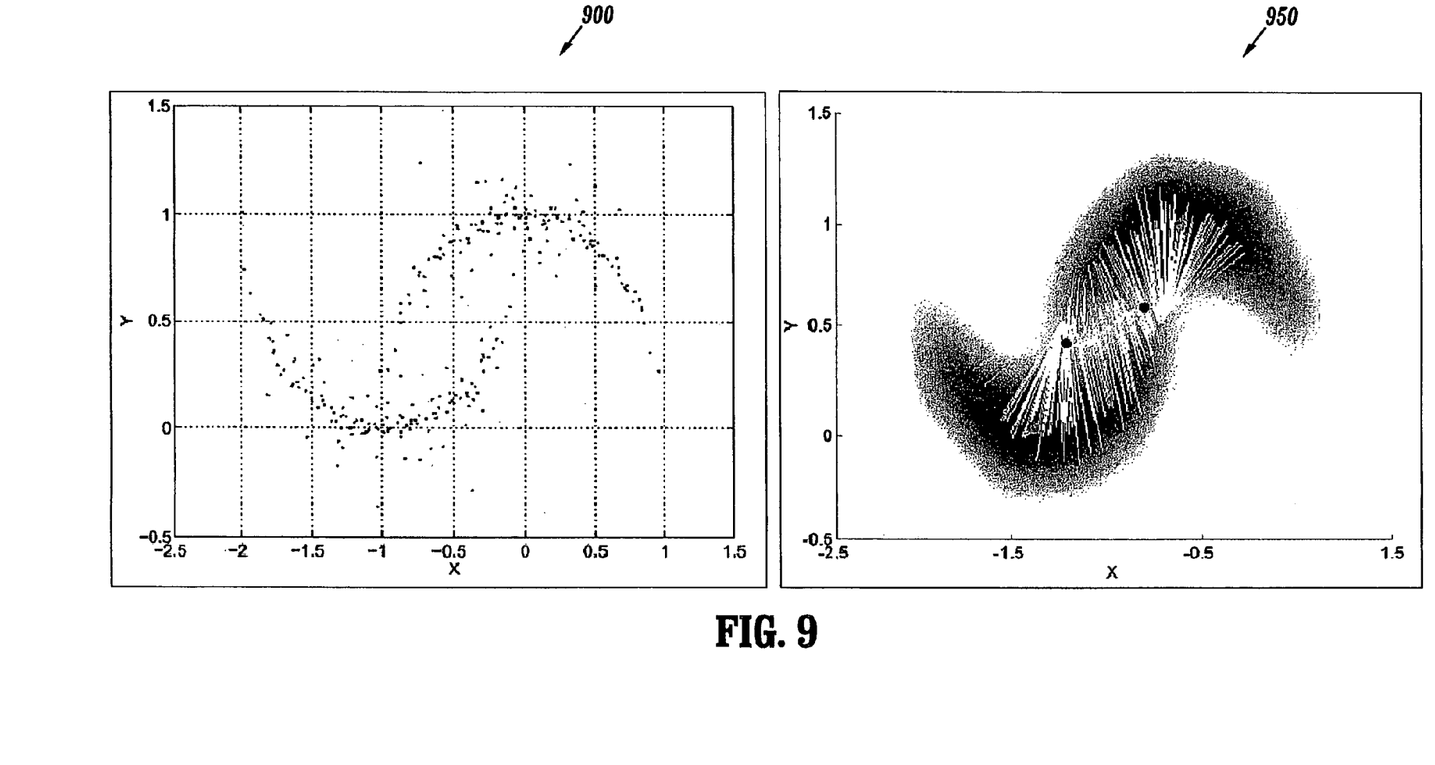
FIG. 9 shows clustering of nonlinear structures. (a) Input data containing 270 data points. (b) The trajectories for saddle point detection are shown. Our algorithm detected two modes and two saddle points. The view angle is from above.

We applied the agglomerative strategy for the decomposition of the nonlinear structures presented in FIG. 9a, and indicated generally by the reference numeral 900. A bandwidth h=0.15 was employed. In the final configuration two modes and two-saddle points were detected, which are indicated generally by the reference numeral 950. The two clusters have a confidence equal to 1.00. The mode densities are 0.7744 and 0.8514 while the saddle densities are 0.2199 and 0.1957. The right saddle point has the largest density. Note that the density values are one order of magnitude larger than in the previous experiment. This is not a concern, since both coordinates were rescaled. Also, note that our test statistic (Eqn. B23) accepts the resealing of the measured density.

Figure 10:
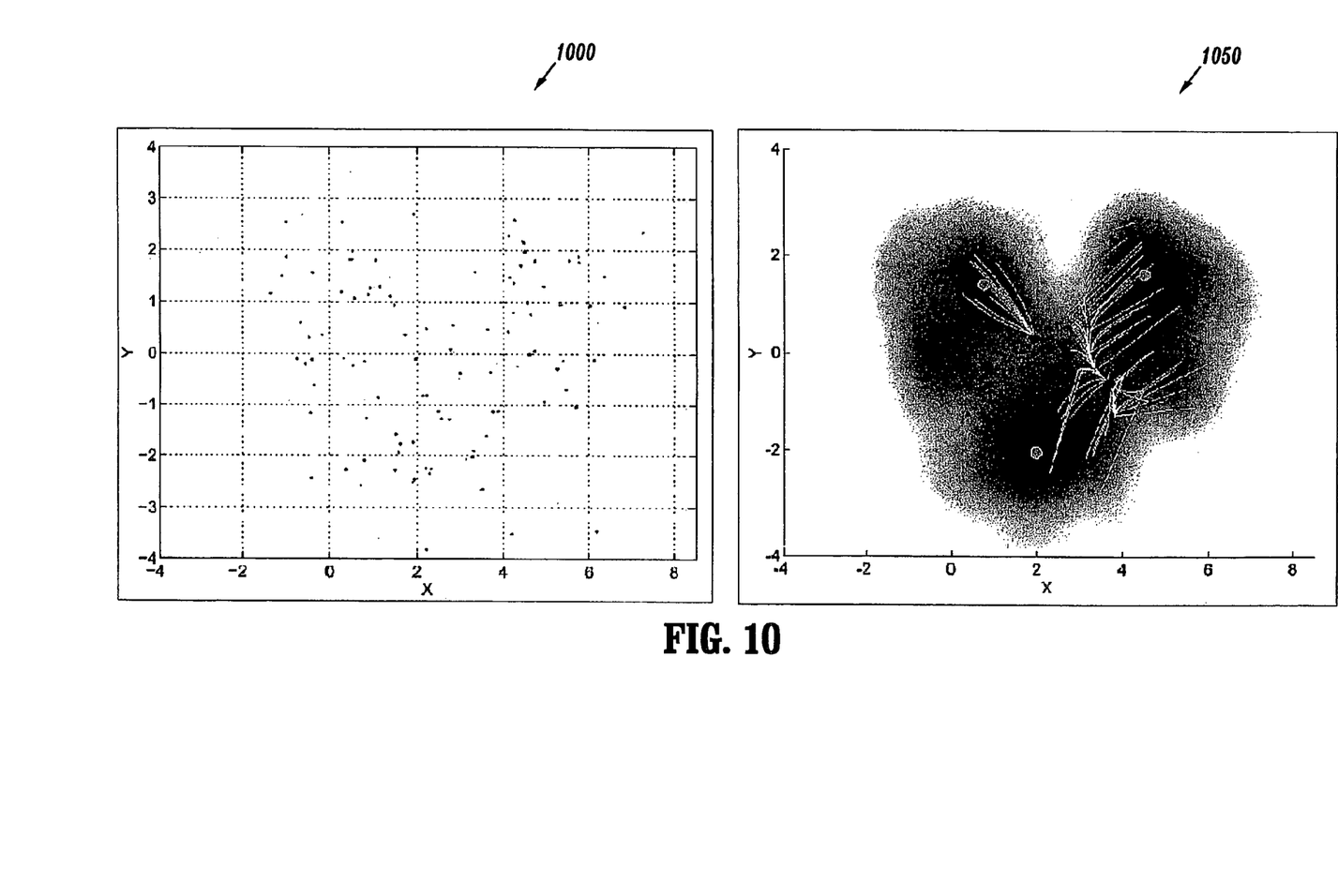
FIG. 10 shows three clusters. (a) Input data containing 100 data points. (b) The trajectories for saddle point detection are shown. Our algorithm detected three modes with high confidence. Only the largest density saddle point for each cluster is shown. The view angle is from above.

The next experiment was performed with h=0.6 for the data shown in FIG. 10 and indicated generally by the reference numeral 1000. Initially the algorithm detected four peaks that can be seen in the density surface shown in FIG. 10b and indicated generally by the reference numeral 1050. However, the upper left peaks were joined together, their clusters having low statistical confidence (0.73 and 0.57). The cluster confidence for the final configuration are 0.921, 0.96 and 0.95. One can observe that the upper left cluster has the lowest confidence.

Figure 11:
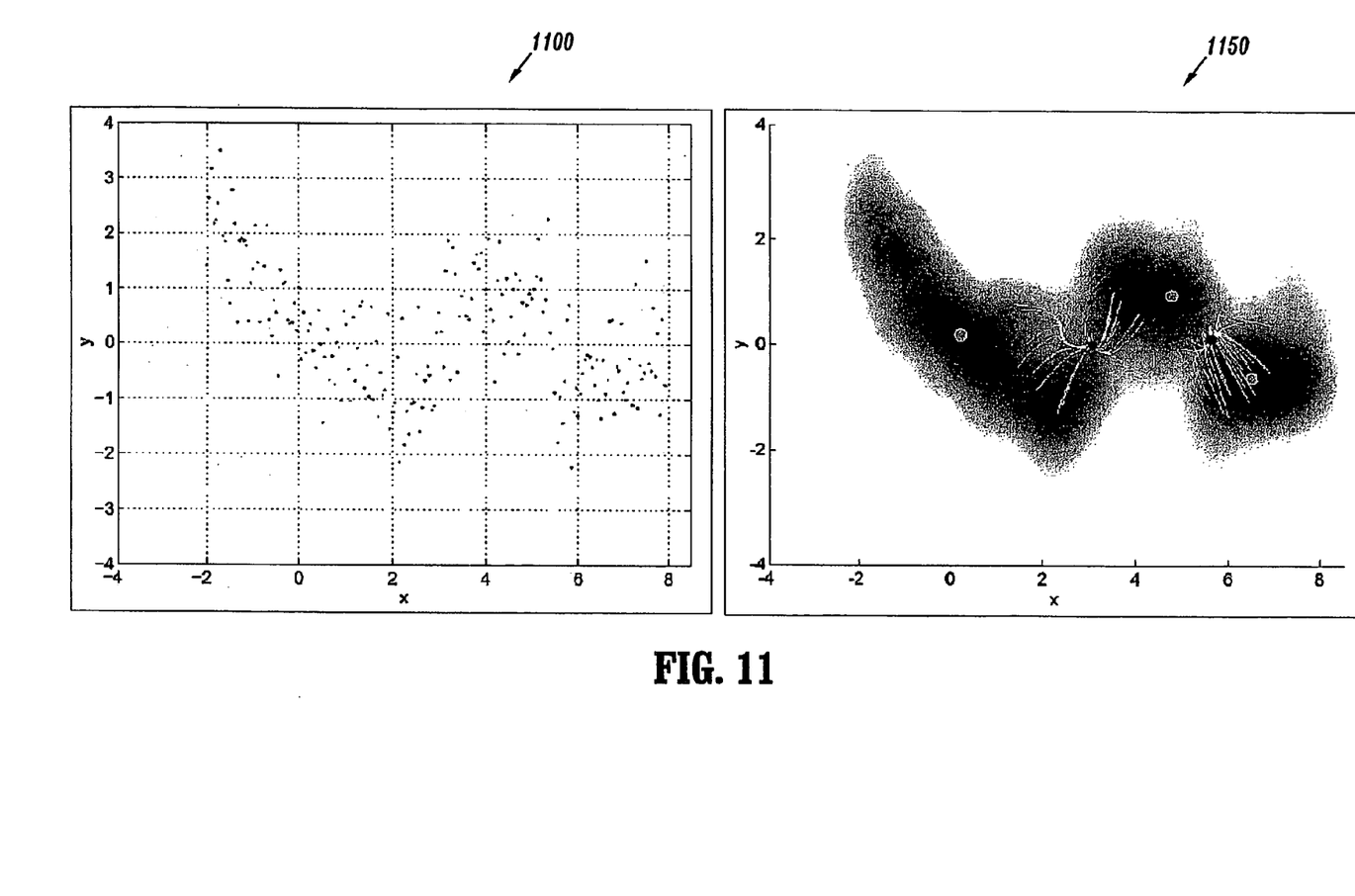
FIG. 11 shows clustering of image:like data. (a) Input data containing 200 data points. (b) The trajectories for saddle point detection are shown. Our algorithms detected three modes with high confidence. Only the largest density saddle point for each cluster is shown. The view angle is from and FIG. 12 shows a flowchart for a method of partitioning an image data set in accordance with an exemplary embodiment of the present disclosure.

A clustering example for image-like data is shown in FIG. 11 and indicated generally by the reference numeral 1100. The 200 points have the x coordinate data points in increasing order (for each unit x coordinate there is one data point of variable y). A bandwidth of h=0.4 was employed. The algorithm detected first 5 clusters indicated generally by the reference numeral 1150 of confidence 0.59, 0.79, 0.61, 0.99, and 0.99, which were reduced to 4 clusters of confidence 0.83, 0.61, 0.99, and 0.99, and finally to three clusters of confidence 1.00, 0.99, and 0.99. All the clusters that were merged belong to the elongated structure from the left.

Testing the Existence of Two Neighboring Clusters

Denote by $x_s$ the saddle point with the largest density lying on the border of a given cluster characterized by the mode $y_m$. The point $x_s$ represents the "weakest" point of the cluster border. It requires the least amount of probability mass which should be taken from the neighborhood of $y_m$ and placed in the neighborhood of $x_s$ such that the cluster mode disappears. The test statistic is derived for the null hypothesis of the mode existence as defined in Equation B23. The p value of the test is the probability that z, which is distributed with N (0 1), is positive, and is given by Equation B24.

A confidence of 0.95 is achieved when z=1.65. To test the existence of two neighboring clusters, we adapt the test by replacing $\hat{f}_K(y_m)$ by $\hat{f}_K(y_1) + \hat{f}_K(y_2)$ where $\hat{f}_K(y_1)$ and $\hat{f}_K(y_2)$ are the densities associated to the modes of the two clusters. In this case, $x_s$ is taken as the common saddle point with the largest density.

Segmentation Experiments

Experimental segmentation results and comparisons are now described. The framework just presented is adapted for the characterization of image clusters in the joint color-spatial domain. The idea is to start with a given decomposition (over segmentation) and join the least significant clusters until they become significant according to the measure of Eqn. B24.

An image segmentation framework is used, which employs mean shift to delineate clusters in a joint space of dimension d=r+2 that typically includes the 2 spatial coordinates, where r=3 for color images, r=1 for gray-level images and r>3 for multi-spectral images. All experiments presented here are performed with a bandwidth $h_r$=20 for the color information, and $h_s$=4 for the spatial domain. To characterize the joint domain clusters, we run the saddle point detection algorithm for each pixel on the cluster boundary. However, the spatial component is fixed and only the color component varies. Then, for every pair of two neighboring clusters we compute the mean density associated with their borders and their peak densities. These values are used in Eqn. B23 to determine the significance of the cluster pair. Only clusters with confidence larger than 0.9 are retained.

Figure 1:
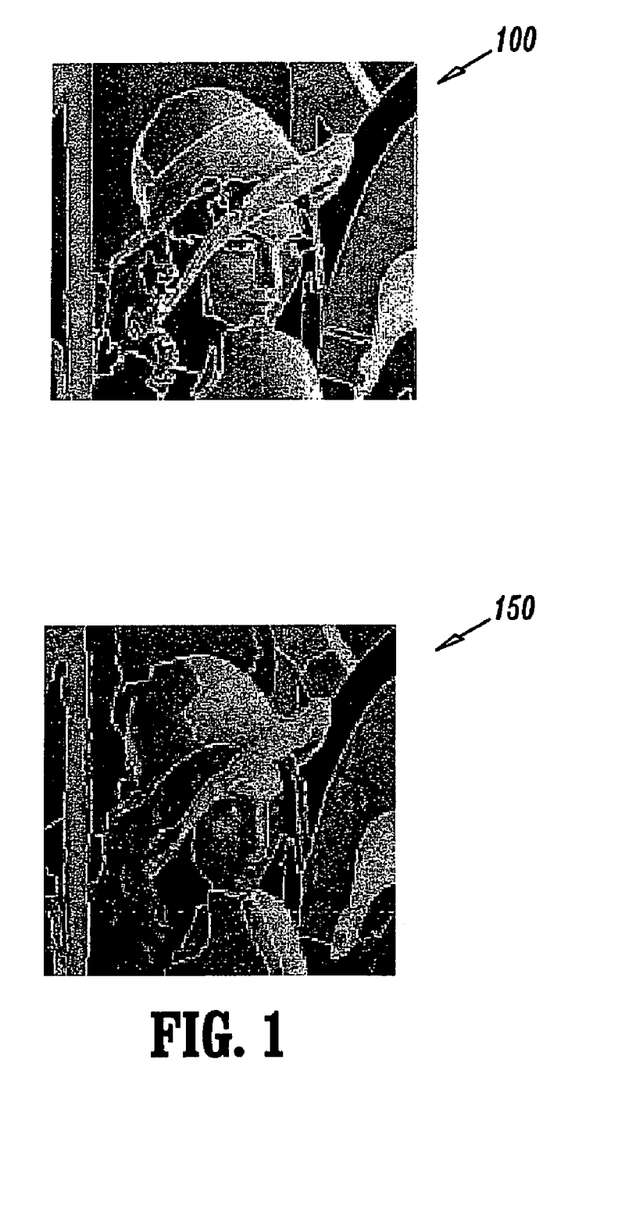
FIG. 1 shows contours for the standardized Lenna dataset for (a) a method according to an embodiment of the present disclosure, and (b) a prior method.

As shown in FIG. 1, the segmentation of image Lenna using the new method is presented and indicated generally by the reference numeral 100. We compare our results with a prior art segmentation method described in the literature and indicated generally by the reference numeral 150. The two algorithms have roughly the same complexity, such as requiring a few seconds on a typical PC for 512×512 images. Observe the quality of hat delineation in comparison to the prior technique.

Figure 2:
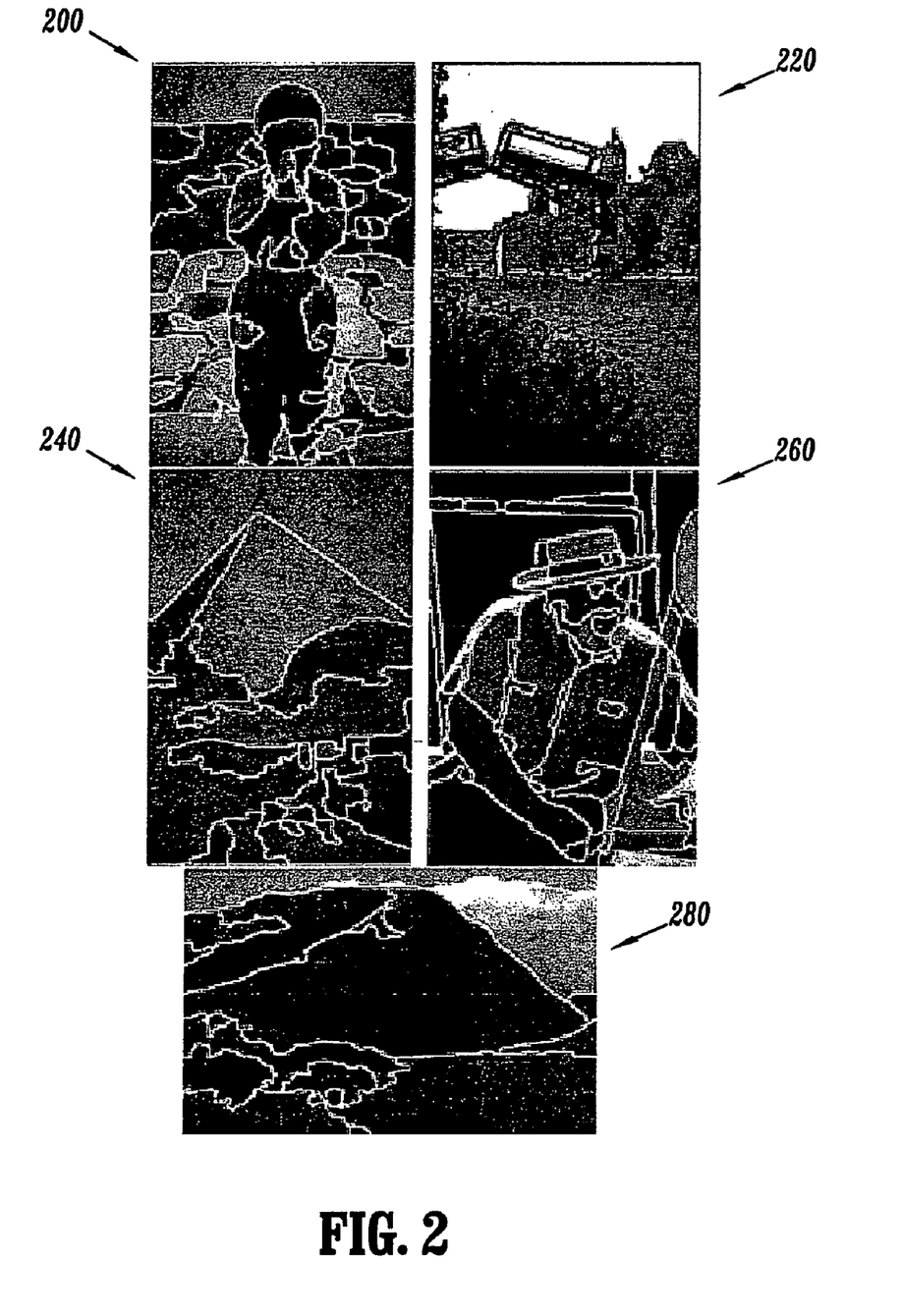
FIG. 2 shows segmentation of images from the Berkeley database.
Figure 3:
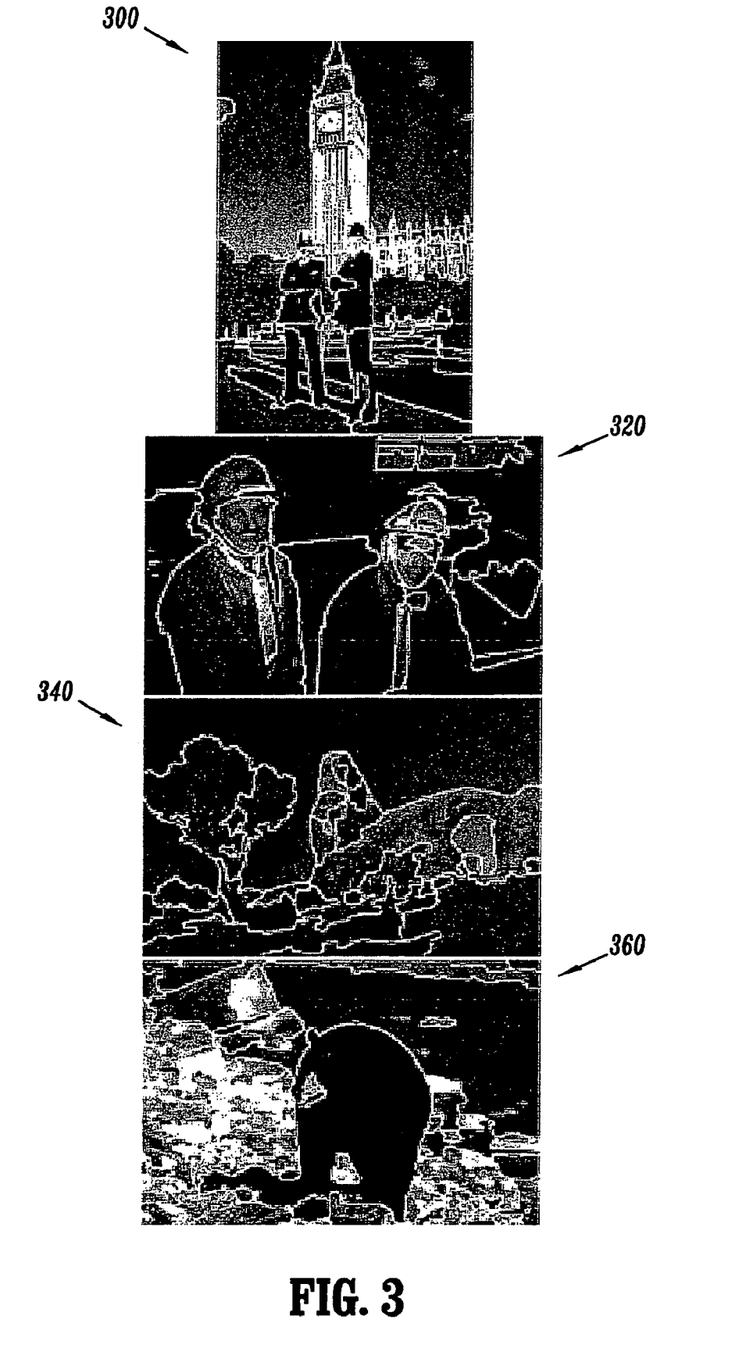
FIG. 3 shows segmentation of images from the Berkeley database.

Turning to FIGS. 2 and 3, two sets of segmented images using the same parameters are presented in FIG. 2, indicated generally by the reference numerals 200, 220, 240, 260 and 280, respectively, and in FIG. 3, indicated generally by the reference numerals 300, 320, 340 and 360, respectively, for data coming from the Berkeley database. Observe the high quality of contours. Thus, hypothesis testing for segmentation is an effective direction for solving decomposition problems and evaluating the significance of the results.

The results presented in this paper show that hypothesis testing for nonparametric clustering is a promising direction for solving decomposition problems and evaluating the significance of the results. Although our simulations are not comprehensive, we believe that the proposed algorithms are powerful tools for image data analysis. The natural way to continue this research is to investigate the data in a multi-scale approach and use our confidence measure to select clusters across scales.

The problem of finding the saddle points of a multivariate surface appears in condensed matter physics and theoretical chemistry. The computation of the energy barrier for the atomic transitions from one stable configuration to another requires the detection of the saddle point of the potential energy surface corresponding to a maximum along a minimum energy path. Numerical algorithms for solving this problem were developed for the case when both the initial and final states of the transitions are known or only the initial state of the transition is known. Compared to these methods that perform constrained optimization on one surface, our technique exploits the clustering of the data points the guide the optimization relative to two surfaces whose superposition represents the initial surface.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for partitioning an image data set comprising a plurality of data points into a plurality of statistically meaningful clusters, the method comprising:
   receiving a data set indicative of an external image;
   decomposing the data set by a mean shift based data decomposition; and
   partitioning the data set by associating each data point with one of a plurality of clusters in response to the mean shift based data decomposition.

2. A method as defined in claim 1 wherein the data set comprises an image and partitioning the data set provides image segmentation.

3. A method as defined in claim 2 wherein the image is segmented as clusters of data points.

4. A method as defined in claim 2 wherein the image is a medical image.

5. A method as defined in claim 2 wherein the image is a video data frame.

6. A method as defined in claim 1 wherein the data set comprises audio data.

7. A method for characterizing the statistical significance of at least one of a plurality of clusters of data points indicative of an external image, the method comprising:
selecting a cluster; and
computing the value of a statistical measure for a saddle point lying on the border of the selected cluster and having the highest density.

8. A method as defined in claim 7 wherein computing the statistical measure comprises detecting a saddle point.

9. A method as defined in claim 8 wherein detecting a saddle point comprises detecting first-order saddle points having a Hessian matrix with one positive eigen-value.

10. A method for merging a plurality of clusters of data points indicative of an external image, the method comprising testing if the value of a statistical measure for a saddle point corresponding to a particular cluster is smaller than a threshold, and if the test is true, then merging the cluster with a neighboring cluster.

11. A method for image segmentation on data indicative of an external image using statistical clustering with saddle point detection, the method comprising:
representing the image data in a joint space of dimension $d=r+2$ that includes two special coordinates, where $r=1$ for gray-scale images, $r=3$ for color images, and $r>3$ for multi-spectral images;
partitioning the data set comprising a plurality of image data points into a plurality of statistically meaningful clusters by decomposing the data set by a mean shift based data decomposition; and
characterizing a statistical significance of at least one of a plurality of clusters of data points by:
selecting a cluster; and
computing the value of a statistical measure for the saddle point lying on the border of the selected cluster and having the highest density.

12. A method as defined in claim 11, further comprising testing if the value of the statistical measure for a saddle point corresponding to a particular cluster is smaller than a threshold, and if the test is true, then merging the cluster with a neighboring cluster.

13. A method as defined in claim 11 wherein computing the statistical measure comprises detecting a saddle point.

14. A method as defined in claim 13 wherein detecting a saddle point comprises detecting first-order saddle points having a Hessian matrix with one positive eigen-value.

15. A method as defined in claim 11 wherein the mean shift paths are defined by a mean shift based decomposition, the decomposition comprising:
for each element in the data set, running the mean shift procedure and storing the peak convergence point;
identifying clusters of convergence points by linking together all elements within a distance measure from each other; and
for each element of the cluster set, joining together all the data points having the corresponding convergence point.

16. A method as defined in claim 13 wherein the saddle point is defined by a saddle point detection algorithm comprising:
receiving a data partitioning into a cluster and another set;
following a mean shift path until a predetermined condition is satisfied; and
following a different mean shift path until convergence to the saddle point.

17. A method for characterizing the statistical significance of a border between adjacent clusters of data points indicative of an external image, the method comprising:
analyzing the border between adjacent clusters to find at least one saddle point;
selecting the saddle point with the highest density value;
computing the value of a statistical measure for the selected saddle point on the border; and
if the value of the statistical measure for the selected saddle point of the border is smaller than a threshold, then merging the clusters adjacent to the border into a single cluster.

18. A method as defined in claim 17 wherein the at least one saddle point is a first-order saddle point.

19. A method as defined in claim 17, further comprising using a statistical test relative to the first-order saddle point to determine the existence of a border between two neighboring clusters.

20. A method as defined in claim 17, further comprising repeating the step of characterizing for each of a plurality of borders between clusters.

21. A method as defined in claim 17, further comprising:
repeating the step of characterizing for each of at least one of a plurality of clusters and a plurality of borders between clusters until the confidence level of each cluster or border is greater than a threshold; and
merging adjacent clusters if the confidence level of each cluster or border is less than a threshold.

22. A method for image segmentation on data indicative of an external image using statistical clustering with saddle point detection, the method comprising:
representing the image data in a joint space of dimension $d=r+2$ that includes two special coordinates, where $r=1$ for gray-scale images, $r=3$ for color images, and $r>3$ for multi-spectral images;
partitioning the data set comprising a plurality of image data points into a plurality of statistically meaningful clusters by decomposing the data set by a mean shift based data decomposition; and
characterizing a statistical significance of a border between adjacent clusters of data points by:
analyzing the border between adjacent clusters to find at least one saddle point;
selecting the saddle point with the highest density value;
computing the value of a statistical measure for the selected saddle point on the border; and
if the value of the statistical measure for the selected saddle point of the border is smaller than a threshold, then merging the clusters adjacent to the border into a single cluster.

23. A method as defined in claim 22 wherein the mean shift paths are defined by a mean shift based decomposition, the decomposition comprising:
for each element in the data set, running the mean shift procedure and storing the peak convergence point;
identifying clusters of convergence points by linking together all elements within a distance measure from each other; and for each element of the cluster set, joining together all the data points having the corresponding convergence point.

24. A method as defined in claim 22 wherein the saddle point is defined by a saddle point detection algorithm comprising:

receiving a data partitioning into a cluster and another set;
following a mean shift path until a predetermined condition is satisfied; and
following a different mean shift path until convergence to the saddle point.

25. A system for image segmentation on data indicative of an external image using statistical clustering with saddle point detection, the system comprising:

representation means for representing the image data in a joint space of dimension $d=r+2$ that includes two special coordinates, where $r=1$ for gray-scale images, $r=3$ for color images, and $r>3$ for multi-spectral images;
partitioning means for partitioning the data set comprising a plurality of image data points into a plurality of statistically meaningful clusters by decomposing the data set by a mean shift based data decomposition; and
characterization means for characterizing a statistical significance of at least one of a plurality of clusters of data points by:
selecting a cluster; and
computing the value of a statistical measure for the saddle point lying on the border of the selected cluster and having the highest density.

26. A system for image segmentation on data indicative of an external image using statistical clustering with saddle point detection, the system comprising:

representation means for representing the image data in a joint space of dimension $d=r+2$ that includes two special coordinates, where $r=1$ for gray-scale images, $r=3$ for color images, and $r>3$ for multi-spectral images;
partitioning means for partitioning the data set comprising a plurality of image data points into a plurality of statistically meaningful clusters by decomposing the data set by a mean shift based data decomposition; and
characterization means for characterizing a statistical significance of a border between adjacent clusters of data points by:
analyzing the border between adjacent clusters to find at least one saddle point;
selecting the saddle point with the highest density value;
computing the value of a statistical measure for the selected saddle point on the border; and
if the value of the statistical measure for the selected saddle point of the border is smaller than a threshold, then merging the clusters adjacent to the border into a single cluster.

27. A program storage device readable by machine, tangibly embodying a program of instructions executable by the machine to perform program steps for image segmentation on data indicative of an external image using statistical clustering with saddle point detection, the program steps comprising:

representing the image data in a joint space of dimension $d=r+2$ that includes two special coordinates, where $r=1$ for gray-scale images, $r=3$ for color images, and $r>3$ for multi-spectral images;
partitioning the data set comprising a plurality of image data points into a plurality of statistically meaningful clusters by decomposing the data set by a mean shift based data decomposition; and
characterizing a statistical significance of at least one of a plurality of clusters of data points by:
selecting a cluster; and
computing the value of a statistical measure for the saddle point lying on the border of the selected cluster and having the highest density.

28. A program storage device readable by machine, tangibly embodying a program of instructions executable by the machine to perform program steps for image segmentation on data indicative of an external image using statistical clustering with saddle point detection, the program steps comprising:

representing the image data in a joint space of dimension $d=r+2$ that includes two special coordinates, where $r=1$ for gray-scale images, $r=3$ for color images, and $r>3$ for multi-spectral images;
partitioning the data set comprising a plurality of image data points into a plurality of statistically meaningful clusters by decomposing the data set by a mean shift based data decomposition; and
characterizing a statistical significance of a border between adjacent clusters of data points by:
analyzing the border between adjacent clusters to find at least one saddle point;
selecting the saddle point with the highest density value;
computing the value of a statistical measure for the selected saddle point on the border; and
if the value of the statistical measure for the selected saddle point of the border is smaller than a threshold, then merging the clusters adjacent to the border into a single cluster.

29. A method for performing image segmentation on data indicative of an external image using statistical clustering with saddle point detection comprising the steps of:

receiving one of image data, video data, speech data, handwriting data and audio data, and extracting feature data points from the data;
partitioning the data into one or more modes and determining a mean/covariance pair for each mode, wherein each data point is associated with a detected mode and a corresponding mean/covariance pair of the mode for each of a plurality of analysis scales;
for each data point, determining the most stable mean/covariance pair associated with the data point; and
for each data point, selecting for output the covariance of the most stable mean/covariance pair for the data point.

30. A method as defined in claim 29 wherein the step of partitioning the data comprises:

decomposing the data set by a mean shift based data decomposition; and
segmenting the data set by associating each data point in response to the mean shift based data decomposition with one of a plurality of clusters.

* * * * *